UNITED STATES PATENT OFFICE.

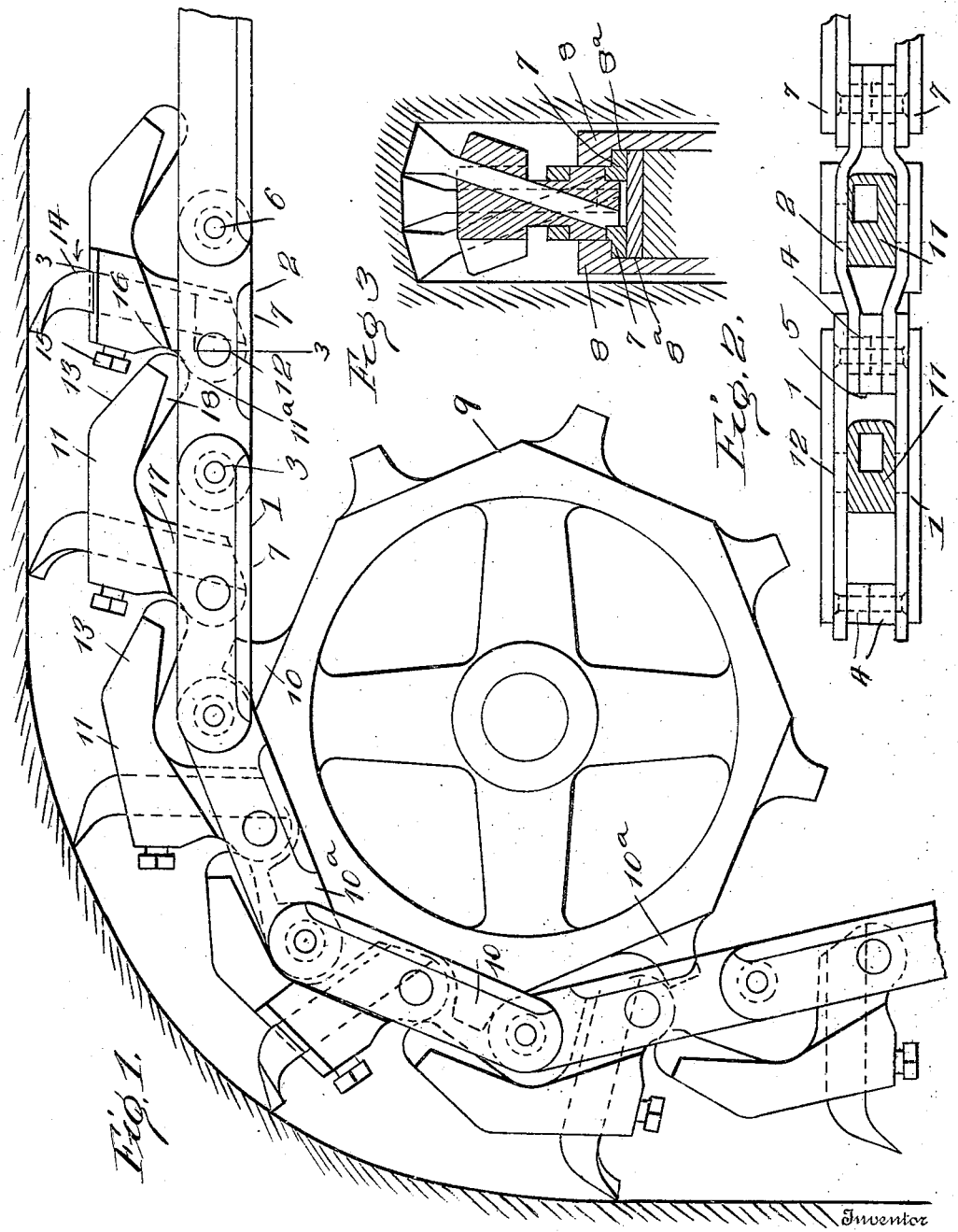

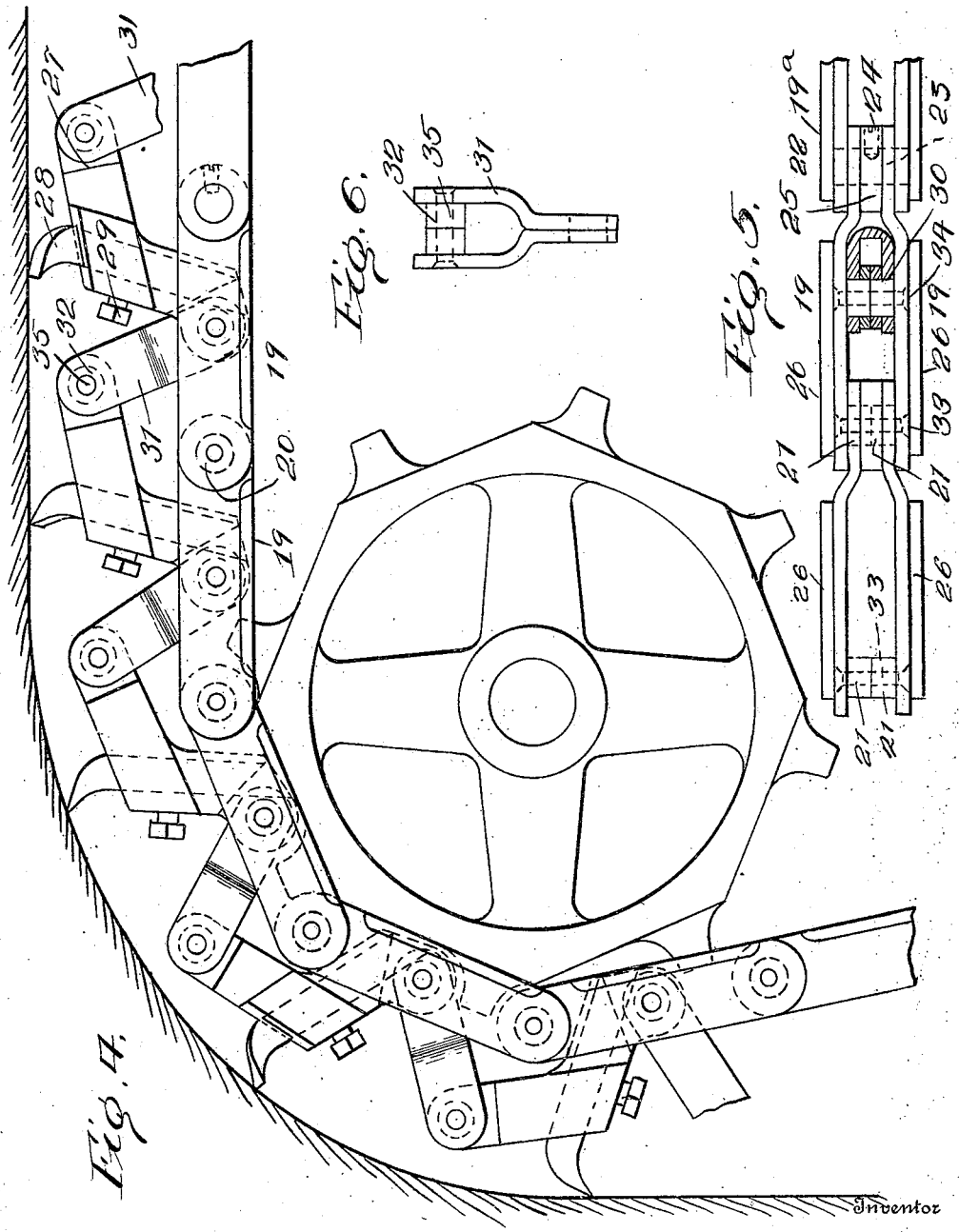

SPENCER JAY TELLER, OF UNADILLA, NEW YORK, ASSIGNOR TO THE JEFFREY MANUFACTURING COMPANY, A CORPORATION OF OHIO.

MINING-MACHINE.

979,597.  Specification of Letters Patent.  Patented Dec. 27, 1910.

Application filed March 18, 1909. Serial No. 484,257.

*To all whom it may concern:*

Be it known that I, SPENCER JAY TELLER, citizen of the United States, residing at Unadilla, in the county of Otsego and State of New York, have invented certain new and useful Improvements in Mining-Machines, of which the following is a specification, reference being had therein to the accompanying drawing.

This invention relates to improvements in chain mining machines and especially to the cutter chain and means for guiding and driving the same.

The object of the invention is to provide a mining machine in which the chain will run smoothly in its guides and in which the cutters will be rigidly supported. Other objects of the invention will appear from the following specification.

In the drawings Figure 1 is a plan view of a sprocket wheel and a section of chain embodying one form of my invention. Fig. 2 is an elevation of the sprocket wheel and a portion of the chain shown in Fig. 1. A section is taken through the cutter carrying blocks along the center line of the chain. Fig. 3 is a sectional elevation along the line 3—3 of Fig. 1. Fig. 4 is a plan view of a section of chain and a sprocket wheel embodying another form. Fig. 5 is an elevation of the sprocket wheel and a portion of the chain shown in Fig. 4. A section is taken through the cutter carrying blocks along the center line of the chain. Fig. 6 is a detail view of the connecting links.

Referring to Figs. 1, 2 and 3 of the drawings, 1—1 and 2—2 represent a series of strap links pivotally connected together at 3. The links 1 are provided at each end with lugs 4 which engage corresponding holes in the ends of the links 2.

5 is a filler washer separating the links 2.

6—6 are rivets passing through the lugs 4 and holding the links 1 in place. Each of the links 1—1 and 2—2 is provided at its inner side with flanges 7 adapted to engage guides 8 on the mining machine. The guides 8 are provided with grooves 8ª with which the flanges 7 of the chain links engage. By the engagement of the link flanges with the grooves the chain parts are maintained in proper working position.

9 is a sprocket wheel rotatably mounted on the mining machine and has a series of equal regularly disposed faces. At the forward ends of the faces are provided sprocket teeth 10 and 10ª which are adapted to engage the chain. Each of the alternate teeth 10ª is made narrow at its forward end in order that it may enter between the links 2. The sprocket wheel is so constructed and positioned that as the chain passes over it each link will lie flat upon one of the faces and thus be rigidly supported.

11—11 are cutter carrying blocks, each pivotally mounted at its forward end, preferably at or near the center of a pair of strap links, by means of the laterally extending lugs 12. Each of these blocks at its forward end has a curved surface or ledge 11ª preferably cylindrical and concentric with the lug 12. At its rear end each block is provided with a rearwardly extending brace or strut 13 adapted to rest upon and be supported by the curved surface of the next following block. On account of the cylindrical form of this supporting surface or ledge any movement of a block cannot in any way affect the position of the preceding block. The blocks are so shaped and so proportioned that the strut will remain in contact with the curved surface as the chain passes around the sprocket wheel.

14—14 are cutters mounted in the blocks 11 and held in place by the set screws 15. The cutter carrying blocks are preferably arranged in groups of three, four or five blocks each. In Fig. 3 I have shown an arrangement of three blocks in a group. Each cutter of the group is located out of line with the other cutters so that the three cutters acting together will form a groove in the coal or other material, of sufficient width to give clearance to the parts of the mining machine.

The blocks are constructed so that there may be a slight clearance between any two blocks, as at 16. This allows for any slight irregularity in the size or shape of the blocks, but at the same time serves to prevent the rear end of any block from swinging outward to an appreciable extent as it might otherwise do when the cutters are not in engagement with the coal. The parts of the blocks indicated by 17 and 18 are of such a thickness that they will enter between the strap links with a good working clearance. It will be noted that the inner parallel sides of the strap links serve as supporting walls perpendicular to the curved surface or ledge 11ᵃ of the cutter blocks. These two parallel walls engage the opposite sides of the rear part 18 of each cutter block and support the block against lateral twisting. The other parts of the blocks are made somewhat wider to give increased strength and to furnish support for the cutters.

Referring to Figs. 4 and 5, 19—19 represent a series of strap links pivotally connected together at 20. These strap links differ from those shown in Figs. 1 and 2 in that all the links are similar, each having a lug 21 at one end adapted to engage a corresponding hole in the next following link. In order that this chain may be finally connected together to form an endless chain, I provide a special coupling means, as shown at 22. 23 is a pin adapted to pass through holes in the links 19 and the links 19ᵃ. 24 is a set screw in the filler washer 25 and is adapted to hold the pin against longitudinal displacement. The strap links are provided with longitudinal flanges 26 similar to those shown in Figs. 1 and 2.

The sprocket wheel is similar to that shown in Figs. 1 and 2, the only difference being that the teeth are all of the same width throughout.

27—27 are cutter carrying blocks having cutters 28 mounted in them and held in place by the set screws 29. These may be arranged in groups similar to that shown in Fig. 3. Each block is forked at its forward end and has holes which are engaged by the secondary lugs 30 mounted upon the links 19. The lower ends of the connecting links 31 pass between the forks of the blocks and are also engaged by the lugs 30. The upper ends of these connecting links have lugs 32 which engage in holes in the rear of the next preceding cutter block. The rivets 33, 34 and 35 are provided to hold the various parts of the chain in place.

The cutter carrying blocks and the connecting links are so shaped and proportioned that the chain will pass freely around the sprocket wheel. The connecting links give at all times direct and positive support for the cutter carrying blocks and hold them securely against any lost motion.

It will be, of course, understood that the form of strap links and the method of connection last described is equally applicable to the form of cutter supports shown in Fig. 1. In the same way, the form of chain shown in Figs. 1 and 2 may be used with the cutter supporting means shown in Fig. 4. In fact, any preferred or usual form of chain may be used and I do not claim the specific construction of this chain as part of my present invention.

I am aware that several methods have been proposed for supporting the cutter carrying blocks upon the adjacent links; but in all of these methods the cutter carrying blocks have served as links in the chain. Thus any supporting means extending to the adjacent links would have to be very accurately formed in order to be effective. Any irregularities, however slight, would cause the supporting means to either fail entirely to engage the adjacent link, or else it would engage it in such a manner as to displace the cutter carrying block and thereby cause undue friction between the flanges of the block and the mining machine guides. Furthermore, in all cases these various supporting means have become inoperative as the chain passed over the sprocket wheel. The cutters are still cutting at this point and it is especially desirable to support the blocks as they are not then guided by the grooves in the mining machine. In the chain embodying my invention the cutter carrying blocks are positively supported in all positions and any irregularities of construction will have no effect other than to slightly change the position of the cutters. The cutter blocks are connected to the links only at their centers and they cannot, therefore, tilt the links in any way and possible tilting of the flanges in the guiding grooves is avoided. All the blocks are similarly connected to the links and the resultant pressure upon each link must be the same and must act in the same direction. There is no possibility of pressure against the outer edge of the guide grooves and this part of the machine may, therefore, be reduced in size and weight. The sprocket wheel supports the chain as it passes over it and as all the pressure must be inward, there can be no tendency for any part of the chain to move outward away from the wheel.

What I claim is:

1. In a mining machine cutter chain, the combination of a series of chain links, a series of cutter blocks, each pivotally attached to a link, and a series of supporting means located on the blocks, each being adapted to hold the cutter block of another link against rotation about its pivotal axis, substantially as set forth.

2. In a mining machine cutter chain, the combination of a chain, and a series of cutter carrying blocks, each of said blocks attached to the chain by a single pivotal connection, each of said blocks provided with a supporting surface, and each of said blocks adapted to engage with and be supported by the supporting surface of the next following block, substantially as set forth.

3. In a mining machine cutter chain, the combination of a chain, and a series of cutter blocks each attached to the chain by a single pivotal connection, each of said cutter blocks being provided with a supporting surface and each of said cutter blocks being adapted to engage with and be supported by the supporting surface of an adjacent cutter block, substantially as set forth.

4. In a mining machine cutter chain, the combination of a chain, and a series of cutter blocks each attached at its forward end to a link of the chain by a single pivotal connection, and means for supporting the rear end of each of the blocks on an adjacent link, substantially as set forth.

5. In a mining machine cutter chain, the combination of a chain, and a series of cutter blocks each having a rear extension, each of said blocks being attached to the chain by a single pivotal connection and each of said blocks having a forward cylindrical surface concentric with its pivotal axis, and adapted to support the rear extension of the next preceding block, substantially as set forth.

6. In a mining machine cutter chain, the combination of a chain, a series of cutter blocks each pivotally mounted on the chain and each having a part adapted to engage an adjacent block and limit its swinging outward about its pivotal axis, substantially as set forth.

7. In a mining machine cutter chain, a series of cutter devices each comprising a link, a cutter block pivotally connected to the link near its center, and a cutter attached to the block, the link of each cutter device being pivotally connected to the links of the next adjacent cutter devices, and the cutter block of each cutter device being supported against rotation upon the next following cutter device, substantially as set forth.

8. In a mining machine cutter chain, the combination of a chain comprising a series of pivotally connected links, and a series of cutter blocks each attached to the chain by a single pivotal connection near the center of one of the links, substantially as set forth.

9. In a mining machine cutter chain, the combination of a chain comprising a series of pivotally connected links and a series of cutter blocks each mounted on the chain by a single pivotal connection near the center of one of the links, and means for holding the said blocks in operative position, substantially as set forth.

10. In a mining machine cutter chain, the combination of a chain comprising a series of pivotally connected links, and a series of cutter blocks each attached to the chain near the center of one of the links by a single pivotal connection, each of said blocks being provided with a supporting surface and each of said cutter blocks being adapted to engage and be supported by the supporting surface of the next following block, substantially as set forth.

11. In a mining machine cutter chain, the combination of a chain comprising a series of pivotally connected links, and a series of cutter blocks each attached to the chain near the center of one of the links by a single pivotal connection, each of said cutter blocks being provided with a supporting surface and each of said cutter blocks being adapted to engage with and be supported by the supporting surface of an adjacent cutter block, substantially as set forth.

12. In a mining machine cutter chain, the combination of a chain comprising a series of pivotally connected links and a series of cutter blocks each attached by a single pivotal connection at its forward end to one of the links near its center, and means for supporting the rear ends of the blocks, substantially as set forth.

13. In a mining machine cutter chain, the combination of a chain comprising a series of pivotally connected links, a series of cutter blocks each attached to one of the links near its center by a single pivotal connection, and each of said blocks having a forward cylindrical surface concentric with its pivotal axis, and each of said blocks being adapted to support the rear end of the next preceding block, substantially as set forth.

14. In a mining machine cutter chain, the combination of a chain comprising a series of pivotally connected links, a series of cutter blocks each pivotally mounted on the chain at a point near the center of one of the links, and means for supporting each block upon an adjacent portion of the chain as the chain passes around a sprocket wheel, substantially as set forth.

15. In a mining machine, the combination of a polygonal sprocket wheel, a chain comprising a series of pivotally connected links, the sprocket wheel and chain being so proportioned and related that as the chain passes over the wheel, each link will lie flat upon one face of the wheel, and cutter blocks pivotally mounted near the centers of the links, each provided with a supporting ledge and a rearward extension adapted to engage the supporting ledge of an adjacent block, substantially as set forth.

16. In a mining machine chain, the combination of a series of chain links, a series of cutter blocks each pivotally attached to one of the links, and each provided with a forward supporting ledge and a rearward extension adapted to engage the supporting ledge of the next following block, the said extension being also adapted to pass between and to engage laterally with the adjacent links to prevent twisting of the cutter block, substantially as set forth.

17. In a mining machine, the combination of a guide and a series of chain links adapted to engage the guide, a series of cutter blocks each pivotally attached to one of the links, means for supporting each block against rotation about its pivotal axis, and means for supporting the end of each block against lateral movement parallel to its pivotal axis, substantially as set forth.

18. In a mining machine, the combination of a chain guide, a chain comprising a series of pivotally connected links and a series of cutter blocks each attached at its forward end to one of the links by a single pivotal connection, and means for supporting the rear ends of the blocks, substantially as set forth.

19. In a mining machine, the combination of a chain guide, a chain adapted to engage the guide, a series of cutter blocks each attached to the chain by a single pivotal connection at its forward end, and means for supporting the rear ends of the blocks, substantially as set forth.

In testimony whereof I affix my signature, in presence of two witnesses.

S. JAY TELLER.

Witnesses:
N. CURTIS LAMMOND,
B. G. BRANN.